US011403846B2

(12) United States Patent
Guo et al.

(10) Patent No.: US 11,403,846 B2
(45) Date of Patent: *Aug. 2, 2022

(54) CROP BOUNDARY DETECTION IN IMAGES

(71) Applicant: X Development LLC, Mountain View, CA (US)

(72) Inventors: Cheng-en Guo, Santa Clara, CA (US); Jie Yang, Sunnyvale, CA (US); Elliott Grant, Woodside, CA (US)

(73) Assignee: X Development LLC, Mountain View, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/138,737

(22) Filed: Dec. 30, 2020

(65) Prior Publication Data
US 2021/0150207 A1   May 20, 2021

Related U.S. Application Data

(63) Continuation of application No. 16/218,374, filed on Dec. 12, 2018, now Pat. No. 10,885,331.

(Continued)

(51) Int. Cl.
*G06K 9/00* (2022.01)
*G06V 20/10* (2022.01)
(Continued)

(52) U.S. Cl.
CPC .......... *G06V 20/188* (2022.01); *A01B 79/005* (2013.01); *G06N 3/08* (2013.01);
(Continued)

(58) Field of Classification Search
CPC . G06T 11/00; G06T 2207/10048; G06T 7/50; G06F 3/012; G06F 3/013;
(Continued)

(56) References Cited

U.S. PATENT DOCUMENTS

| 5,367,385 A | 11/1994 | Yuan |
|---|---|---|
| 7,916,898 B2 | 3/2011 | Anderson |

(Continued)

FOREIGN PATENT DOCUMENTS

| CN | 102982486 A | 3/2013 |
|---|---|---|
| CN | 104063718 A | 9/2014 |

(Continued)

OTHER PUBLICATIONS

Extended European Search Report dated Sep. 13, 2021, issued in corresponding European Application No. EP 1974388, filed Jan. 15, 2019, 7 pages.

(Continued)

*Primary Examiner* — Quan M Hua
(74) *Attorney, Agent, or Firm* — Christensen O'Connor Johnson Kindness PLLC

(57) ABSTRACT

In embodiments, obtaining a plurality of image sets associated with a geographical region and a time period, wherein each image set of the plurality of image sets comprises multi-spectral and time series images that depict a respective particular portion of the geographical region during the time period, and predicting presence of a crop at particular locations within the particular portion of the geographical region associated with an image set of the plurality of image sets. Determining crop boundary locations within the particular portion of the geographical region based on the predicted presence of the crop at the particular locations, and generating a crop indicative image comprising at least one image of the multi-spectral and time series images of the image set overlaid with indication of crop areas, wherein the crop areas are defined by the determined crop boundary locations.

20 Claims, 7 Drawing Sheets

Related U.S. Application Data

(60) Provisional application No. 62/620,908, filed on Jan. 23, 2018.

(51) Int. Cl.

| | | |
|---|---|---|
| *G06N 3/08* | (2006.01) | |
| *G06T 7/11* | (2017.01) | |
| *G06Q 50/02* | (2012.01) | |
| *A01B 79/00* | (2006.01) | |
| *G06V 20/68* | (2022.01) | |

(52) U.S. Cl.
CPC .............. *G06Q 50/02* (2013.01); *G06T 7/11* (2017.01); *G06T 2207/20081* (2013.01); *G06T 2207/30188* (2013.01); *G06V 20/68* (2022.01)

(58) Field of Classification Search
CPC .. G06F 3/04815; G06F 16/29; G06F 16/9537; G06V 10/40; G06V 20/13; G06V 10/454; G06V 10/82; G06V 20/58; G06V 10/457; G06V 10/56; G06V 10/758; G06V 20/20; G06V 20/64; G06V 20/647; G06V 40/166; G06V 40/171; G06V 40/172; G06V 40/50; G06K 9/6256; G06K 9/627; H04N 13/117; H04N 13/239; H04N 13/243; H04N 13/254; H04N 13/271
See application file for complete search history.

(56) References Cited

U.S. PATENT DOCUMENTS

| | | | |
|---|---|---|---|
| 8,417,534 B2 | 4/2013 | Belzer et al. | |
| 9,152,938 B2 | 10/2015 | Lang et al. | |
| 9,256,907 B2 | 2/2016 | Macy | |
| 9,619,734 B2 | 4/2017 | Marchisio et al. | |
| 10,885,331 B2 * | 1/2021 | Guo | G06T 7/11 |
| 2007/0036467 A1 | 2/2007 | Coleman et al. | |
| 2014/0002489 A1 * | 1/2014 | Sauder | G06T 11/00 |
| | | | 345/629 |
| 2014/0172754 A1 | 6/2014 | He et al. | |
| 2016/0171680 A1 * | 6/2016 | Lobell | G06T 7/00 |
| | | | 382/110 |
| 2016/0247082 A1 | 7/2016 | Stehling et al. | |
| 2017/0161560 A1 | 6/2017 | Itzhaky et al. | |
| 2017/0213109 A1 | 7/2017 | Moody et al. | |
| 2018/0373932 A1 * | 12/2018 | Albrecht | G06V 10/82 |

FOREIGN PATENT DOCUMENTS

| | | |
|---|---|---|
| JP | 11283008 A | 10/1999 |
| JP | 2013033346 A | 2/2013 |
| WO | 2017221641 A1 | 12/2017 |

OTHER PUBLICATIONS

International Search Report and Written Opinion from the International Searching Authority dated Mar. 22, 2019 for International Application No. PCT/US19/13708, filed Jan. 15, 2019, 11 pages.
Wardlow et al., "Analysis of Time-Series MODIS 250 m Vegetation Index Data for Crop Classification in the U.S. Central Great Plains," Remote Sensing of Environment, 108:3, Jun. 15, 2007, 22 pages.
Office Action dated Dec. 16, 2021, in corresponding Chinese application No. 201980009840.5 (Chinese version), filed Jan. 15, 2019, 16 pages.
Office Action dated Oct. 1, 2021, in corresponding Japanese application No. 2020-540260, 9 pages.
Kussul, N. et al., "Deep Learning Classification of Land Cover and Crop Types Using Remote Sensing Data", IEEE Geoscience and Remote Sensing Letters, IEEE, Mar. 31, 2017, vol. 14, No. 5, pp. 778-782.
Office Action dated Jul. 30, 2021, in corresponding Canadian application No. 3,088,737, filed Jan. 15, 2019, 6 pages.

* cited by examiner

CROP BOUNDARY DETECTION IN IMAGES

CROSS-REFERENCE TO RELATED APPLICATIONS

The present application is a Continuation of U.S. patent application Ser. No. 16/218,374, filed Dec. 12, 2018, which claims priority to Provisional Patent Application No. 62/620,908, filed Jan. 23, 2018, the entire disclosures of which are hereby incorporated by reference herein for all purposes.

TECHNICAL FIELD

This disclosure relates generally to image feature detection, and in particular but not exclusively, relates to use of machine learning in image feature detection.

BACKGROUND INFORMATION

Approximately 11% of earth's land surface is presently used in crop production. Despite the importance of agriculture for human survival, environmental impact, national implications, commercial enterprises, the markets, and the like, there is no consistent, reliable, and/or precise identification of all the agricultural fields within a geographical region, county, state, country, continent, planet wide, or portions of any of the above. If more information about agricultural fields were known, seed and fertilizer companies, for example, may better determine available markets for their products in different geographical regions; crop insurance companies may more accurately and cost-effectively assess premiums; banks may more accurately provide farm loans; and/or governments may better assess taxes, allocate subsidies, determine regional food capacity, plan infrastructure, and the like.

To the extent that mapping data related to agricultural land may exist, such data tends to be inconsistent, inaccurate, out of date, and/or otherwise incomplete for many practical uses. For example, a governmental entity may survey or sample a small portion of the total agricultural lands and/or farmers within a geographical region and extrapolate the small data set to approximate the field locations, sizes, shapes, crop types, counts, etc. of all the agricultural lands actually in existence within the geographical region. Due to the labor-intensive nature of gathering such data, the agricultural land data tends to be updated infrequently (or too infrequently for many commercial purposes).

Agricultural land use tends to vary from region to region, over time, and the like. Farms tend to be significantly smaller in size in developing countries than in developed countries. Crops may also change from season to season or from one year to the next for the same field. Agricultural land may be re-purposed for non-agricultural uses (e.g., housing developments). Thus, it would be beneficial to accurately identify agricultural land on a sufficiently granular level for one or more particular geographical regions (e.g., a county, a country, a planet), and to maintain agricultural land feature information inexpensively and with sufficient frequency.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for crop boundary detection in images are described herein. In some embodiments, a method includes obtaining a plurality of image sets associated with a geographical region and a time period, wherein each image set of the plurality of image sets comprises multi-spectral and time series images that depict a respective particular portion of the geographical region during the time period; predicting presence of a crop at particular locations within the particular portion of the geographical region associated with an image set of the plurality of image sets; determining crop boundary locations within the particular portion of the geographical region based on the predicted presence of the crop at the particular locations; and generating a crop indicative image comprising at least one image of the multi-spectral and time series images of the image set overlaid with indication of crop areas, wherein the crop areas are defined by the determined crop boundary locations.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
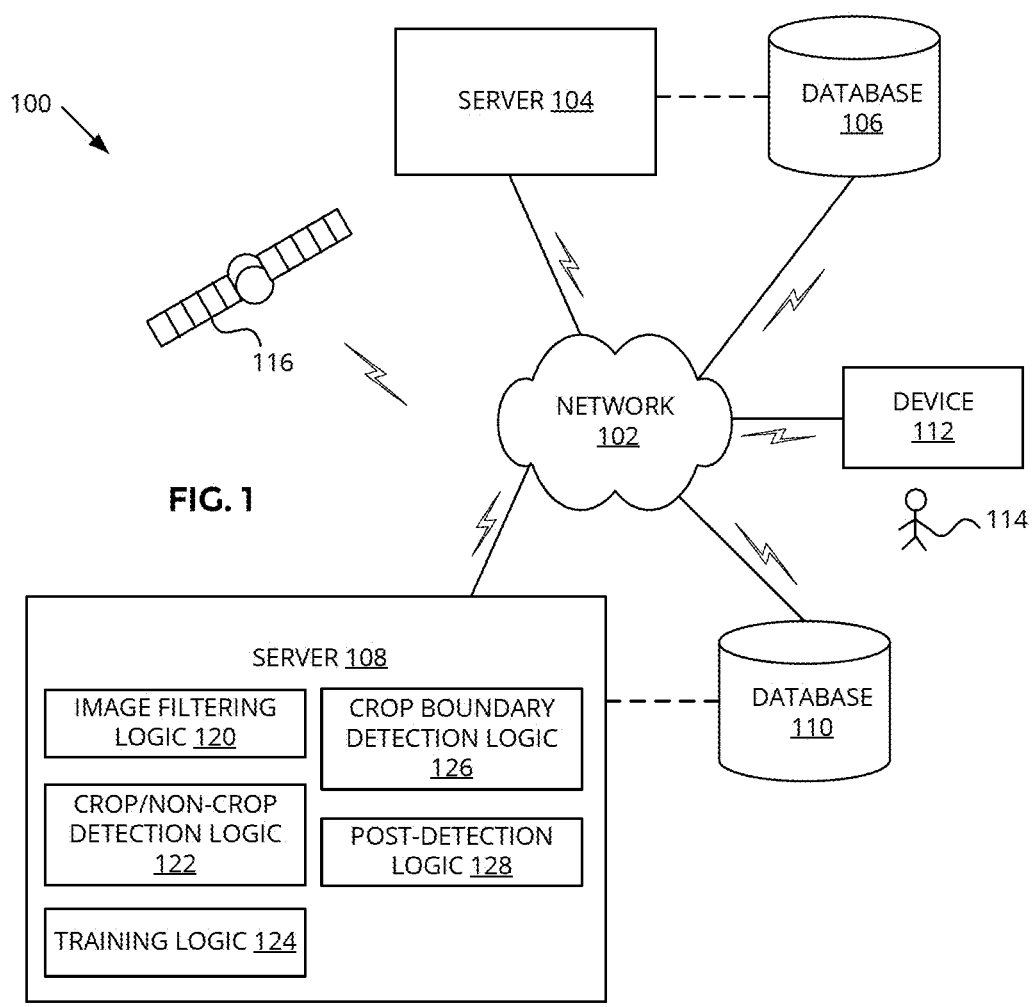
FIG. 1 depicts a block diagram illustrating a network view of an example system incorporated with the crop boundary detection technology of the present disclosure, according to some embodiments.

FIG. 1 depicts a block diagram illustrating a network view of an example system 100 incorporated with the crop boundary detection technology of the present disclosure, according to some embodiments. System 100 may include a network 102, a server 104, a database 106, a server 108, a database 110, a device 112, and an aerial image capture device 116. One or more of the server 104, database 106, server 108, database 110, device 112, and aerial image capture device 116 may communicate with the network 102. At least the server 108 may include the crop boundary detection technology of the present disclosure to facilitate automatic detection of crop boundaries in images at a sub-meter resolution, as described more fully below.

Network 102 may comprise one or more wired and/or wireless communications networks. Network 102 may include one or more network elements (not shown) to physically and/or logically connect computer devices to exchange data with each other. In some embodiments, network 102 may be the Internet, a wide area network (WAN), a personal area network (PAN), a local area network (LAN), a campus area network (CAN), a metropolitan area network (MAN), a virtual local area network (VLAN), a cellular network, a carrier network, a WiFi network, a WiMax network, and/or the like. Additionally, in some embodiments, network 102 may be a private, public, and/or secure network, which may be used by a single entity (e.g., a business, school, government agency, household, person, and the like). Although not shown, network 102 may include, without limitation, servers, databases, switches, routers, gateways, base stations, repeaters, software, firmware, intermediating servers, and/or other components to facilitate communication.

Server 104 may comprise one or more computers, processors, cellular infrastructure, network infrastructure, back haul infrastructure, hosting servers, servers, work stations, personal computers, general purpose computers, laptops, Internet appliances, hand-held devices, wireless devices, Internet of Things (IoT) devices, portable devices, and/or the like configured to facilitate collection, management, and/or storage of aerial images of land surfaces at one or more resolutions (also referred to as land surface images, land images, imageries, or images). For example, server 104 may command device 116 to obtain images of one or more particular geographical regions, to traverse a particular orbit, to obtain images at a particular resolution, to obtain images at a particular frequency, to obtain images of a particular geographical region at a particular time period, and/or the like. As another example, server 104 may communicate with device 116 to receive images captured by the device 116. As still another example, server 104 may be configured to obtain/receive images with associated crop relevant information included (e.g., crop type identification, crop boundaries, road locations identified, and/or other annotated information) from governmental sources, users (e.g., such as user 114), and the like. As will be discussed in detail below, images with associated crop relevant information included may comprise human labeled images, United States Department of Agriculture (USDA) Cropland data layer (CDL) data, United States Farm Service Agency (FSA) Common Land Units (CLU) data, ground truth data, and/or the like.

Server 104 may communicate with device 116 directly with each other and/or via network 102. In some embodiments, server 104 may include one or more web servers, one or more application servers, one or more intermediating servers, and the like.

Database 106 may comprise one or more storage devices to store data and/or instructions for use by server 104, device 112, server 108, and/or database 110. For example, database 106 may include images and associated metadata provided by the device 116. The content of database 106 may be accessed via network 102 and/or directly by the server 104. The content of database 106 may be arranged in a structured format to facilitate selective retrieval. In some embodiments, database 106 may comprise more than one database. In some embodiments, database 106 may be included within server 104.

Server 108 may comprise one or more computers, processors, cellular infrastructure, network infrastructure, back haul infrastructure, hosting servers, servers, work stations, personal computers, general purpose computers, laptops, Internet appliances, hand-held devices, wireless devices, Internet of Things (IoT) devices, portable devices, and/or the like configured to implement one or more features of the crop boundary detection technology of the present disclosure, according to some embodiments. Server 108 may be configured to use images and possible associated data provided by the server 104/database 106 to train and generate a machine learning based model that is capable of automatically detecting crop boundaries existing within each image of a plurality of images of land surfaces within a predetermined level of confidence/accuracy. The crop boundary identification may be at a sub-meter level of granularity or resolution. The "trained" machine learning based model may be configured to identify the crop boundaries in images unsupervised by humans. The model may be trained by implementing supervised machine learning techniques. Server 108 may also facilitate access to and/or use of images with the crop boundaries identified.

Server 108 may communicate with one or more of server 104, database 106, database 110, and/or device 112 directly or via network 102. In some embodiments, server 108 may also communicate with device 116 to facilitate one or more functions as described above in connection with server 104. In some embodiments, server 108 may include one or more web servers, one or more application servers, one or more intermediating servers, and/or the like.

Server 108 may include hardware, firmware, circuitry, software, and/or combinations thereof to facilitate various aspects of the techniques described herein. In some embodiments, server 108 may include, without limitation, image filtering logic 120, crop/non-crop detection logic 122, training logic 124, crop boundary detection logic 126, and post-detection logic 128. As will be described in detail below, image filtering logic 120 may be configured to apply one or more filtering, "cleaning," or de-noising techniques to images to remove artifacts and other undesirable data from the images. Crop/non-crop detection logic 122 may be configured to determine the crop and non-crop areas (also referred to as a crop/non-crop heat map) of an image. Crop/non-crop detection logic 122 may comprise at least a portion of the "trained" machine learning based model. Training logic 124 may be configured to facilitate supervised learning, training, and/or refinement of one or more machine learning techniques to generate the crop/non-crop detection logic 122. Alternatively, training logic 124 may be configured to support unsupervised learning, semi-supervised learning, reinforcement learning, computer vision techniques, and/or the like.

Crop boundary detection logic 126 may be configured to detect or identify crop boundaries (e.g., closed boundaries) within images based on the crop and non-crop areas of images determined by the crop/non-crop detection logic 122. A unique crop field or sub-field may be associated with each of the detected crop boundaries. Post-detection logic 128 may be configured to perform one or more post crop boundary detection activities such as, but not limited to, assigning a unique identifier to each unique crop field (or crop sub-field) associated with a detected crop boundary, providing crop fields (or sub-fields) search capabilities, crop boundary detection update capabilities, and/or the like.

In some embodiments, one or more of logic 120-128 (or a portion thereof) may be implemented as software comprising one or more instructions to be executed by one or more processors included in server 108. In alternative embodiments, one or more of logic 120-128 (or a portion thereof) may be implemented as firmware or hardware such as, but not limited to, an application specific integrated circuit (ASIC), programmable array logic (PAL), field programmable gate array (FPGA), and the like included in the server 108. In other embodiments, one or more of logic 120-128 (or a portion thereof) may be implemented as software while other of the logic 120-128 (or a portion thereof) may be implemented as firmware and/or hardware.

Although server 108 may be depicted as a single device in FIG. 1, it is contemplated that server 108 may comprise one or more servers and/or one or more of logic 120-128 may be distributed over a plurality of devices. In some embodiments, depending on computing resources or limitations, one or more of logic 120-128 may be implemented in a plurality of instances.

Database 110 may comprise one or more storage devices to store data and/or instructions for use by server 108, device 112, server 104, and/or database 110. For example, database 110 may include images provided by server 104/database 106/device 116, ground truth data used to build and/or train the crop/non-crop detection logic 122, crop/non-crop heat maps generated by the crop/non-crop detection logic 122, crop boundaries identified by the crop boundary detection logic 126, prior knowledge data used by the crop boundary detection logic 126, identifier and other associated image and/or crop boundary information, data to be used by any of logic 120-128, data generated by any of logic 120-128, data to be accessed by user 114 via device 112, and/or data to be provided by user 114 via device 112. The content of database 110 may be accessed via network 102 and/or directly by the server 108. The content of database 110 may be arranged in a structured format to facilitate selective retrieval. In some embodiments, database 110 may comprise more than one database. In some embodiments, database 110 may be included within server 108.

Device 112 may comprise one or more computers, work stations, personal computers, general purpose computers, laptops, Internet appliances, hand-held devices, wireless devices, Internet of Things (IoT) devices, portable devices, smart phones, tablets, and/or the like. In some embodiments, the user 114 may interface with the device 112 to provide data to be used by one or more of logic 120-128 (e.g., manual identification of crop boundaries on select images to serve as ground truth data, modification or correction of crop boundaries predicted in accordance with the crop boundary detection logic 126) and/or to request data associated with the predicted crop boundaries (e.g., search for a particular crop field (or sub-field), request visual display of particular images overlaid with the predicted crop boundaries). At least the training logic 124 and/or post-detection logic 128 may facilitate functions associated with the device 112. The user 114 providing data for use in crop boundary detection may be the same or different from a user that requests data that has been generated in accordance with performance of the crop boundary detection.

Device 116 may comprise one or more of satellites, airplanes, drones, hot air balloons, and/or other devices capable of capturing a plurality of aerial or overhead photographs of land surfaces. The plurality of aerial photographs may comprise a plurality of multi-spectral, time series images. Device 116 may include one or more location tracking mechanisms (e.g., global positioning system (GPS)), multi-spectral imaging mechanisms, weather condition detection mechanisms, time date stamp generation mechanisms, mechanism to detect the distance from the land surface, and/or associated image metadata generation capabilities to provide associated image information for each image of the plurality images captured. Device 116 may be manually and/or automatically operated, and the captured images may be provided via a wired or wireless connection to server 104, server 108, or other devices. Device 116 may also be deployed over the same locations a plurality of times over a particular time period so as to capture time series images of the same location. Examples of images (associated with ground truth data or for which automatic crop boundary detection may be desired) that may be provided by or generated from the images provided by device 116 include, without limitation, Landsat 7 satellite images, Landsat 8 satellite images, Google Earth images, and/or the like.

Although discrete components are discussed above in connection with FIG. 1, components may be combined. For instance, servers 104 and 108 may comprise a single component, databases 106 and 110 may comprise a single component, and/or device 112 may be combined with server 108.

Figure 2:
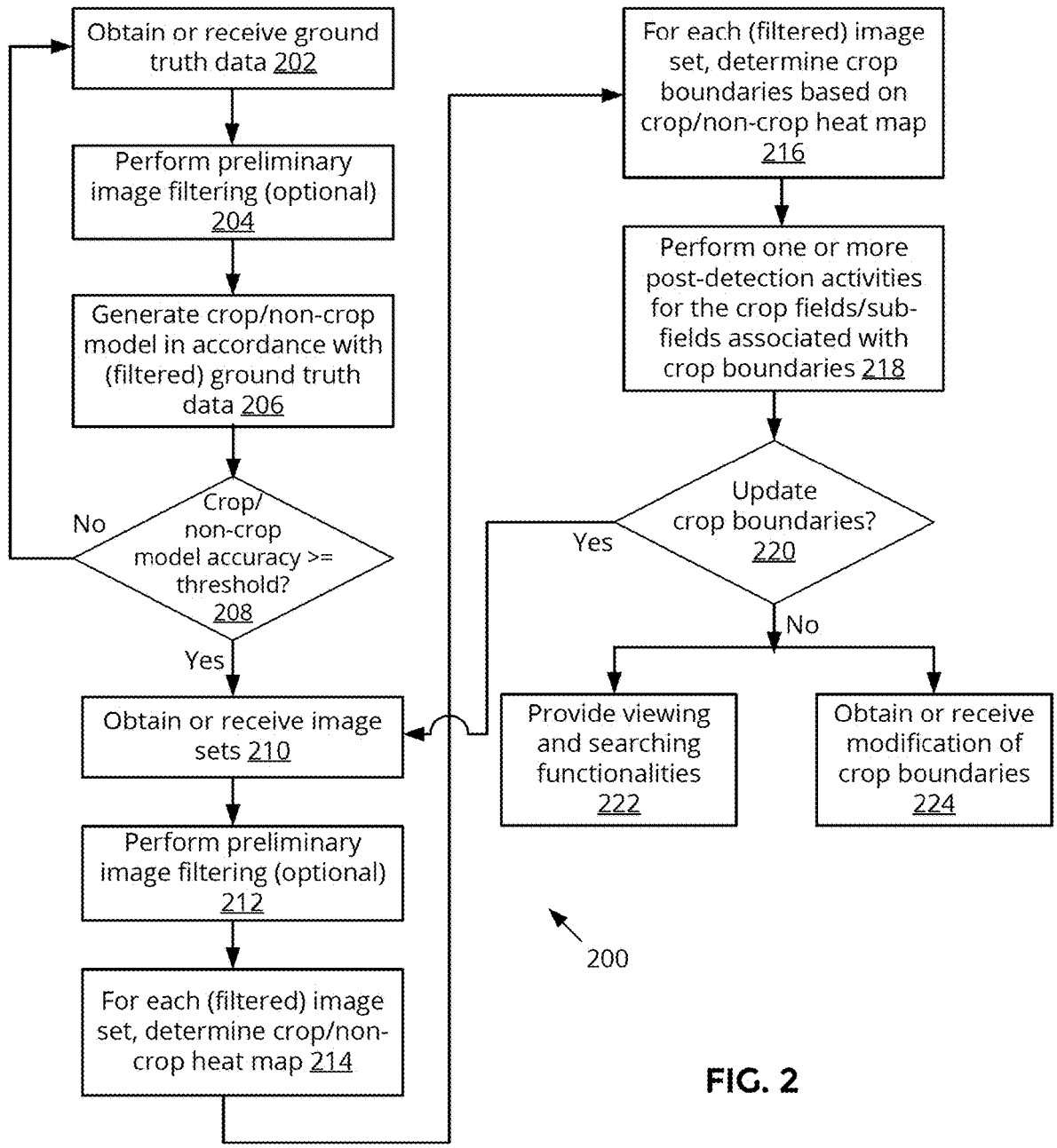
FIG. 2 depicts a flow diagram illustrating an example process that may be implemented by the system of FIG. 1, according to some embodiments.

FIG. 2 depicts a flow diagram illustrating an example process 200 that may be implemented by the system 100 to generate a crop boundary detection model, perform crop boundary detection using the generated crop boundary detection model, and provide various access to the crop field/sub-fields information associated with the crop boundaries, according to some embodiments.

At block 202, training logic 124 may be configured to obtain or receive ground truth data comprising a plurality of land surface images with identified crop boundaries. The plurality of images comprising the ground truth data may be selected to encompass those having a variety of land features, crop boundaries, and the like so as to train/generate a detection model capable of handling different land features and crop boundaries that may be present in images to undergo detection.

In some embodiments, the plurality of images may comprise images containing multi-spectral data (e.g., red green blue (RGB) spectrum, visible spectrum, near infrared (NIR), normalized difference vegetative index (NDVI), infrared (IR), or the like) (also referred to as multi-spectral images or imagery). The plurality of images may also comprise time series images, in which a same geographical location may be imaged a plurality of times over a particular time period. The particular time period may comprise, without limitation, a crop growing season (e.g., May to October), a year, a plurality of years, years 2008 to 2016, and/or other predetermined times. The imaging frequency may be hourly, daily, weekly, bi-weekly, monthly, seasonally, years, or the like. The images associated with a particular geographical location and, optionally, for a particular time period, may be referred to as an image set. A plurality of image sets may be included in the ground truth data.

In some embodiments, ground truth data may comprise existing images with identified crop boundaries (or crop fields) in which the crop boundaries (or crop fields) may be identified at a low (ground) resolution (e.g., greater than a meter resolution, 3 to 250 meter resolution, 30 meter resolution, etc.). Such images may be of high frequency, such as daily to bi-weekly refresh rate. Because the crop boundary identification is at a low resolution, such identification may be deemed to be "noisy," approximate, or inaccurate. Examples of existing images with low resolution identified crop boundaries may include, without limitation, the USDA CDL data, FSA CLU data, government collected data, sampled or survey based data, farmer reports, and/or the like. Existing images with identified crop boundaries may be obtained by the server 104, stored in database 106, and/or provided to the server 108.

In some embodiments, ground truth data may comprise CDL and CLU data (as discussed above) and/or human labeled data. Human labeled data may comprise crop boundaries in images that are manually identified, labeled, or annotated by, for example, user 114 via a graphical user interface (GUI) mechanism provided on the device 112. Such manual annotation may be at a higher (ground) resolution than may be associated with CDL and/or CLU data. Images that are manually labeled may be obtained from device 116, for example. The images may be images that may otherwise be applied to the crop boundary detection model for crop boundary detection but for the crop boundaries having been manually identified. Training logic 124 may facilitate selection of images, presentation of selected images, use of human labeled images, and/or the like. Ground truth data may also be referred to as training data, model building data, model training data, and the like.

In some embodiments, the time period and/or geographical region(s) associated with the ground truth data may be the same (or approximately the same) as the time period and/or geographical region(s) associated with the images for which the crop boundaries are to be detected (at block 216). For example, for images taken during years 2008 to 2016 to be acted upon at block 216, the CLU data from the year 2008 may be used, the CDL data from the years 2008-2016 may be used, and the human labeled data may comprise images taken during 2008 to 2016. CLU and CDL data may comprise image data of the United States and the human labeled data may also comprise image data of the United States.

Next, at block 204, image filtering logic 120 may be configured to perform preliminary filtering of one or more images comprising the ground truth data. In some embodiments, the preliminary filtering may comprise monitoring for clouds, shadows, haze, fog, atmospheric obstructions, and/or other land surface obstructions included in the images on a per pixel basis. On a per pixel basis, if such obstruction is detected, then the image filtering logic 120 may be configured to determine whether to address the obstruction, how to correct for the obstruction, whether to omit the image information associated with the pixel of interest in constructing the model at block 206, and/or the like. For example, if a first pixel does not include land surface information because of a cloud but a geographical location associated with a second pixel adjacent to the first pixel is imaged because it is not obscured by a cloud, then the image filtering logic 120 may be configured to change the first pixel value to the second pixel value. As another example, known incorrect pixel values in a given image may be substituted with pixel values from corresponding pixels in another image within the same image set (e.g., from a different image in the same time series for the same geographical location). In other embodiments, block 204 may be optional.

With the ground truth data obtained and, optionally, preliminarily filtered or corrected, the resulting ground truth data may be applied to one or more machine learning techniques/systems to generate or build a crop/non-crop model, at block 206. In some embodiments, the crop/non-crop model may comprise the crop/non-crop detection logic 122. The machine learning technique/system may comprise, for example, a convolutional neural network (CNN) or supervised learning system. The crop/non-crop model may be configured to provide a probabilistic prediction of crop or non-crop for each pixel corresponding to a particular geographic location associated with an image set provided as the input. Since ground truth data comprises images with crop boundaries accurately identified, the machine learning technique/system may learn which land surface features in images are indicative of crops or not crops. Such knowledge, when sufficiently detailed and accurate, may then be used to automatically identify crop boundaries in images for which crop boundaries may be unknown.

In some embodiments, the crop/non-crop model may be associated with a particular geographical region, the same geographical region captured in the images comprising the ground truth data. For example, the crop/non-crop model may be specific to a particular county within the United States. Likewise, the crop/non-crop model may also be associated with a particular time period, the same time period associated with the images comprising the ground truth data. As the geographical region gets larger, data inconsistencies or regional differences may arise, which may result in a less accurate crop/non-crop model.

Next, the training logic 124 may be configured to determine whether the accuracy of the crop/non-crop model equals or exceeds a pre-determined threshold. The pre-determined threshold may be 70%, 80%, 85%, 90%, or the like. If the model's accuracy is less than the pre-determined threshold (no branch of block 208), then process 200 may return to block 202 to obtain/receive additional ground truth data to apply to the machine learning techniques/systems to refine the current crop/non-crop model. Providing additional ground truth data to the machine learning techniques/systems comprises providing additional supervised learning data so that the crop/non-crop model may be better configured to predict whether a pixel depicts a crop (or is located within a crop field) or not a crop (or is not located within a crop field). One or more iterations of blocks 202-208 may occur until a sufficiently accurate crop/non-crop model may be built.

If the model's accuracy equals or exceeds the pre-determined threshold (yes branch of block 208), then the crop/non-crop model may be deemed to be acceptable for use in unsupervised or automatic crop/non-crop detection for images in which crop boundaries (or crop fields) are unknown. At block 210, a plurality of images to be applied to the crop/non-crop model for automatic detection may be obtained or received. The plurality of images may be those captured by the device 116.

In some embodiments, the plurality of images may comprise a plurality of image sets, in which each image set of the plurality of image sets may be associated with a respective portion/area (e.g., a county of the United States) of a plurality of portions/areas (e.g., all counties of the United States) that collectively comprise a geographical region (e.g., the United States) for which all crop fields/sub-fields located therein may be desired to be identified. For each portion/area of the plurality of portions/areas, the associated image set may comprise: (1) at least one image for each of a plurality of time points (e.g., May 1, June 1, July 1, August 1, September 1, and October 1) and (2) for a respective time point of the plurality of time points, there may also be one or more images, in which each image may provide specific/different spectral information from another image taken at the same time point (e.g., a first image taken on May 1 comprises a RGB image, a second image taken on May 1 comprises a NIR image, a third image taken on May 1 comprises a NDVI image, etc.).

The overall geographical region covered by the plurality of images may be the same (or approximately the same) geographical region associated with the images used in block 202 to generate the crop/non-crop model. In other words, the crop/non-crop model generated in block 206 may have been developed specifically tailored for use on the images in block 210. Such a crop/non-crop model may also be referred to as a local or localized crop/non-crop model. The plurality of images obtained in block 210 may also be associated with the same time period as the time period of the crop/non-crop model. Continuing the example above, the crop/non-crop model generated in block 206 may be associated with the United States and the years 2008-2016 (because the images used to train and build the model were images of the United States taken during the years 2008-2016) and the plurality of images in block 210 may similarly be images of the United States taken during the years 2008-2016.

Each image within an image set may depict the same land location (at the same orientation and at the same distance from the surface) except that the images differ from each other in multi-spectral and/or time series content. Hence, each image within the image set may be the "same" image except that land surface features may differ across different times and/or different spectrums/color composition schemes. In some embodiments, images within image sets comprising the ground truth data in block 202 may have similar characteristics.

The images of block 210 may then be preliminarily filtered by the image filtering logic 120, at block 212. In some embodiments, block 212 may be similar to block 204 except the images acted upon are those of block 210 rather than those of block 202. In other embodiments, if the images were taken (or retaken, as necessary) to ensure that clouds and other obstructions are not present in the images, then block 212 may be optional.

Next at block 214, crop/non-crop detection logic 122 may be configured to determine a crop/non-crop heat map for each (filtered) image set of the plurality of image sets obtained in block 210. For each image set of the plurality of image sets, the image set may be provided as inputs to the crop/non-crop model generated in block 206, and in response, the crop/non-crop model may provide a prediction/determination of whether a crop is depicted on a per pixel basis. In other words, predicting the presence of a crop (or no crop) at particular locations within the particular portion of the geographical region associated with a respective image set. Each pixel of the heat map may indicate the relative or absolute probability of a crop or not a crop. For example, a zero probability of a crop may be indicated by the absence of an indicator, the highest probability for a crop may be indicated by the darkest or brightest shade of red, and probabilities in between may be appropriately graduated in color, shade, tone, pattern, or the like between no indication and the darkest/brightest red color. In some embodiments, the heat map may be vectorized from a raster format.

The multi-spectral and time series images comprising an image set for the same geographical area may permit detection of specific land surface feature changes over time, which facilitates determination of whether a particular area is more likely to be a crop area. For example, crop colors may change over the course of the growing season. Crop fields before planting, during the growing season, and after harvest may look different from each other. Particular patterns of crop color changes over time may indicate the type of crop being grown (e.g., wheat, soy, corn, etc.). When a crop is planted and/or harvested may indicate the type of crop being grown. If a first type of crop is grown in a given crop field in a first year and then a second type of crop different from the first type of crop is grown in the same crop field in a second year, the changes detected between the two years may indicate that the geographical location associated with that crop field may be a crop area.

Figure 3:
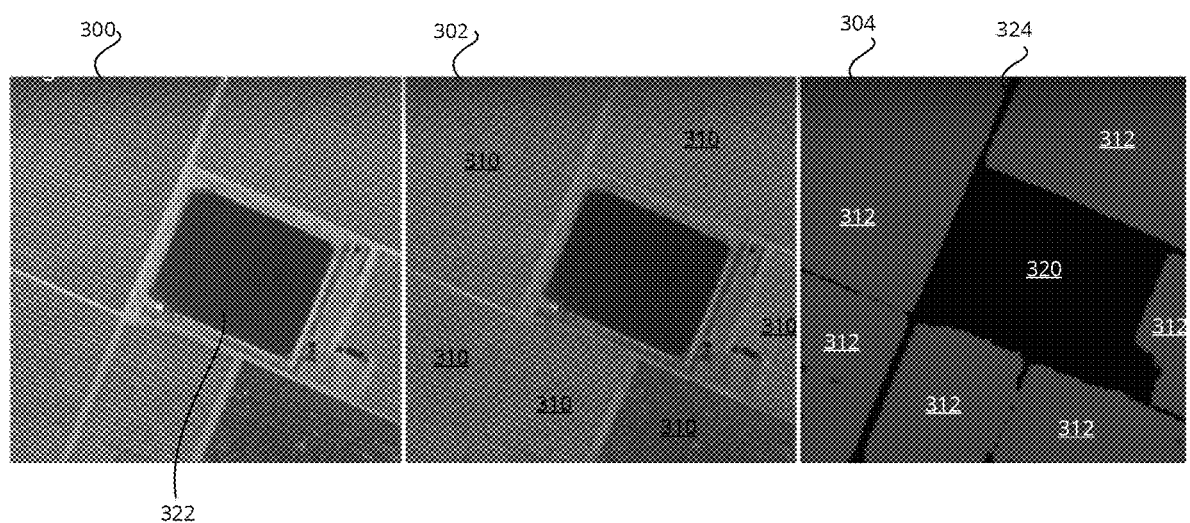
FIG. 3 depicts example images in accordance with the crop boundary detection technique of the present disclosure, according to some embodiments.

In some embodiments, the probabilistic predictions of crop/no crop provided by the heat map may be indicated by use of particular colors, patterns, shadings, tones, or other indicators overlaid on the original image. FIG. 3 depicts example images in accordance with the crop boundary detection technique of the present disclosure, according to some embodiments. Image 300 depicts a raw/original image from an image set, image 302 depicts image 300 with the crop/non-crop heat map overlaid, and image 304 depicts crop boundary predictions for image 300. In image 300, a variety of surface features are shown, including the roof of a building 322. At block 214, image 300 along with the rest of the images in the image set corresponding to image 300 may be applied to the crop/non-crop model. The resulting crop/non-crop heat map outputted by the crop/non-crop model may be as shown in image 302. In image 302, areas 310 (indicated by a different color than in image 300) may comprise the crop areas predicted by the crop/non-crop model.

Returning to FIG. 2, at block 216, the crop boundary detection logic 126 may be configured to determine crop boundaries based on the crop/non-crop heat map, for each image set of the plurality of image sets of block 210. In addition to use of the crop/non-crop heat map, the crop boundary location determination may also be in accordance with prior knowledge information, application of de-noising techniques, application of clustering and region growing techniques, and/or the like.

In some embodiments, crop boundary detection logic 126 may be configured to use prior knowledge information in determining the crop boundaries. Prior knowledge information may comprise, without limitation, known locations of roadways, waterways, woodlands, buildings, parking lots, fences, walls, and other physical structures; known information about agricultural or farming practices such as particular boundary shapes arising from particular agricultural/farming practices proximate to the geographical location associated with the image set (e.g., straight line boundaries or circular boundaries in the case of known use of pivot irrigation); crop types; and/or the like. De-noising or filtering techniques may be implemented to determine crop boundaries and/or to refine the crop boundaries. Applicable de-noising or filtering techniques may include, without limitation, techniques to smooth preliminarily determined crop boundaries (e.g., since in the absence of physical barriers, boundaries tend to be linear or follow a geometric shape). Similarly, clustering and region growing techniques may be employed to determine or refine the crop boundaries. Non-supervised clustering and region growing techniques may be used to reclassify stray pixels from non-crop to crop or vice versa in areas in which a few pixels deviate from a significantly larger number of pixels surrounding them. For instance, if a few pixels are classified as non-crop within a larger area that is classified as crop, then those few pixels may be reclassified as crop.

Crop boundaries associated with each crop area/field/sub-field may be determined or identified to a sub-meter (ground) resolution, a resolution of approximately 0.15 to 0.2 meter, a resolution less than 0.5 meter, a resolution less than approximately 0.2 meter, and the like.

Crop boundaries may define close shaped areas. Crop boundaries may comprise crop field boundaries or, in the presence of sufficient information in the image set and/or prior knowledge information, crop sub-field boundaries. Crop field boundaries may define a crop field, which may comprise a physical area delineated by fences, permanent waterways, woodlands, roads, and the like. A crop sub-field may comprise a subset of a crop field, in which a portion of the physical area of the crop field contains predominantly a particular crop type that is different from a predominant crop type in another portion of the physical area of the crop field. Each of the different crop type portions of the physical area may be deemed to be a crop sub-field. Thus, a crop field may contain one or more crop sub-fields. For example, a crop field may include a first crop sub-field of corn and a second crop sub-field of soy.

In some embodiments, the crop/non-crop heat map provided by the crop/non-crop detection logic 122 may indicate the likelihood of crop areas, while the crop boundary detection logic 126 may be configured to make a final determination of which of the pixels indicated as likely to depict crops in the crop/non-crop heat map comprise crop field(s) or crop sub-field(s). The perimeter of a crop field or sub-field defines the associated crop field or sub-field boundary.

Figure 4A:
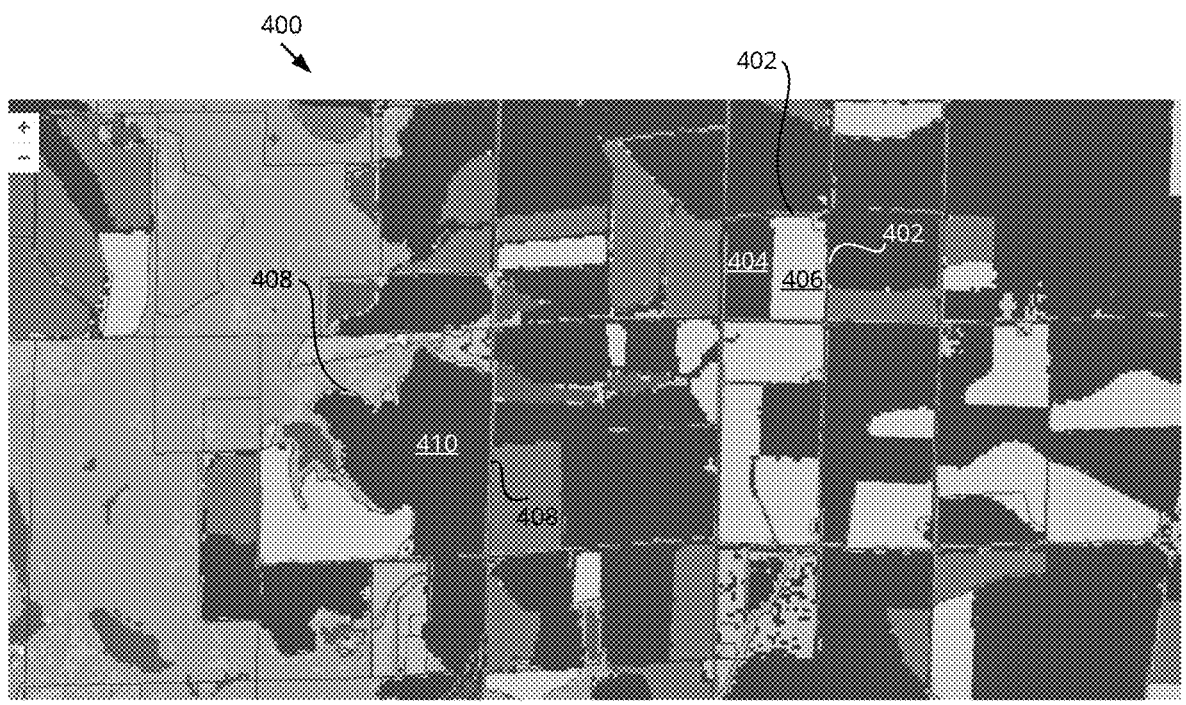
FIGS. 4A-4B depict example images overlaid with crop boundaries and identified crop fields and sub-fields, according to some embodiments.

In FIG. 3, image 304 includes crop areas 312 defined by the crop boundaries identified in block 216 for the image set including image 300. Roadway 324 and building and surrounding area 320 (associated with building 322) are shown as non-crop areas. FIG. 4A depicts an example image 400 overlaid with crop boundaries and identified crop fields and sub-fields defined by such crop boundaries, according to some embodiments. Within a crop boundary 402, a first crop sub-field 404 and a second crop sub-field 406 may exist. Conversely, within a crop boundary 408, only a crop field 410 may exist.

With the crop boundaries and associated crop fields/sub-fields identified for all image sets, process 200 may proceed to block 218, in which the post-detection logic 128 may be configured to perform one or more post-detection activities in accordance with the identified crop fields/sub-fields for all of the image sets (e.g., for the overall geographical region). For each crop field/sub-field that has been identified based on the identified crop boundaries, post-detection activities may include, without limitation, calculating the area of the crop field/sub-field, assigning a unique identifier to the crop field/sub-field (e.g., a unique computer generated identification number (GUID) that will never be reused on another crop field/sub-field), classifying the crop field/sub-field within a classification system (e.g., the crop field/sub-field may be classified, assigned, labeled, or associated with a particular continent, country, state, county, and the like), and/or generating associated metadata for use in storage, retrieval, search, and/or updating activities. In some embodiments, post-detection activities may further include overlaying indications of identified crop fields/sub-fields on the original images so as to visually present the crop field/sub-field detection results, and otherwise visually augmenting the original images with detected information. Data resulting from the post-detection activities may be maintained in database 110.

Figure 4B:

In some embodiments, for each image set, the post-detection logic 128 may be configured to generate a new image (also referred to as a crop indicative image) depicting the original image (e.g., at least one image of the plurality of images comprising the image set) overlaid with indicators of the crop fields and sub-fields (and/or crop boundaries), similar to image 400 of FIG. 4A. FIG. 4B depicts another example image 420 that may comprise the generated new image, according to some embodiments. Image 420 shows indications of four crop boundaries 422, 426, 430, and 434 overlaid on a raw/original photograph image. Each of the closed areas defined by the crop boundaries 422, 426, 430, 434 comprises a crop area/field/sub-field. Thus, crop boundaries 422, 426, 430, 434 indicate respective crop area/field/sub-field 424, 428, 432, 436 in image 420.

If viewing, searching, or other activities involving particular crop fields/sub-fields is performed, such generated new image may be displayed to the user.

Next at block 220, post-detection logic 128 may be configured to determine whether crop boundaries are to be updated. An update may be triggered based on availability of new images (e.g., in near real time to potential changes in one or more crop boundaries), a time/date event (e.g., a new year, a new growing season), enough time lapsed since the last update, some pre-set time period (e.g., periodically, weekly, bi-weekly, monthly, seasonally, yearly, etc.), and/or the like. If an update is to be performed (yes branch of block 220), then process 200 may return to block 210. If no update is to be performed (no branch of block 220), then process 200 may proceed to blocks 222 and 224.

At block 222, post-detection logic 128 may be configured to provide crop field/sub-field viewing and searching functionalities. Application programming interfaces (APIs), websites, apps, and/or the like may be implemented for users to variously access the crop field/sub-field data. For example, users may search for particular crop fields/sub-fields by latitude/longitude, county, size, shape, GUID, or any other search parameter(s). Images with crop boundaries and/or crop fields/sub-fields overlaid may be displayed to users. Users may perform searches and view crop field/sub-field data via the device 112, for instance.

At block 224, post-detection logic 128 may be configured to facilitate accepting modification of crop boundaries that have been automatically identified by authorized users. The farmer that planted the crops may notice that the crop boundaries and/or crop fields/sub-fields identified in the database for his/her crops are incorrect and may manually label the images with the correct crop boundaries. Modification capabilities may be similar to generating human labeled images in block 202. Provided modifications, which may be subject to approval, may then be used to update the database 110. The provided modifications may also be used as ground truth data to refine the crop/non-crop model.

In this manner, a complete database of crop fields/sub-fields (or crop boundaries) for a given geographical region (e.g., county, state, country, continent, planet) may be automatically generated, which is granular to a sub-meter resolution, and may be kept up-to-date over time with minimal supervision. For a plurality of geographical regions, assuming ground truth data for respective geographical regions of the plurality of geographical regions exists, process 200 may be performed for each of the plurality of geographical regions.

Figure 5:
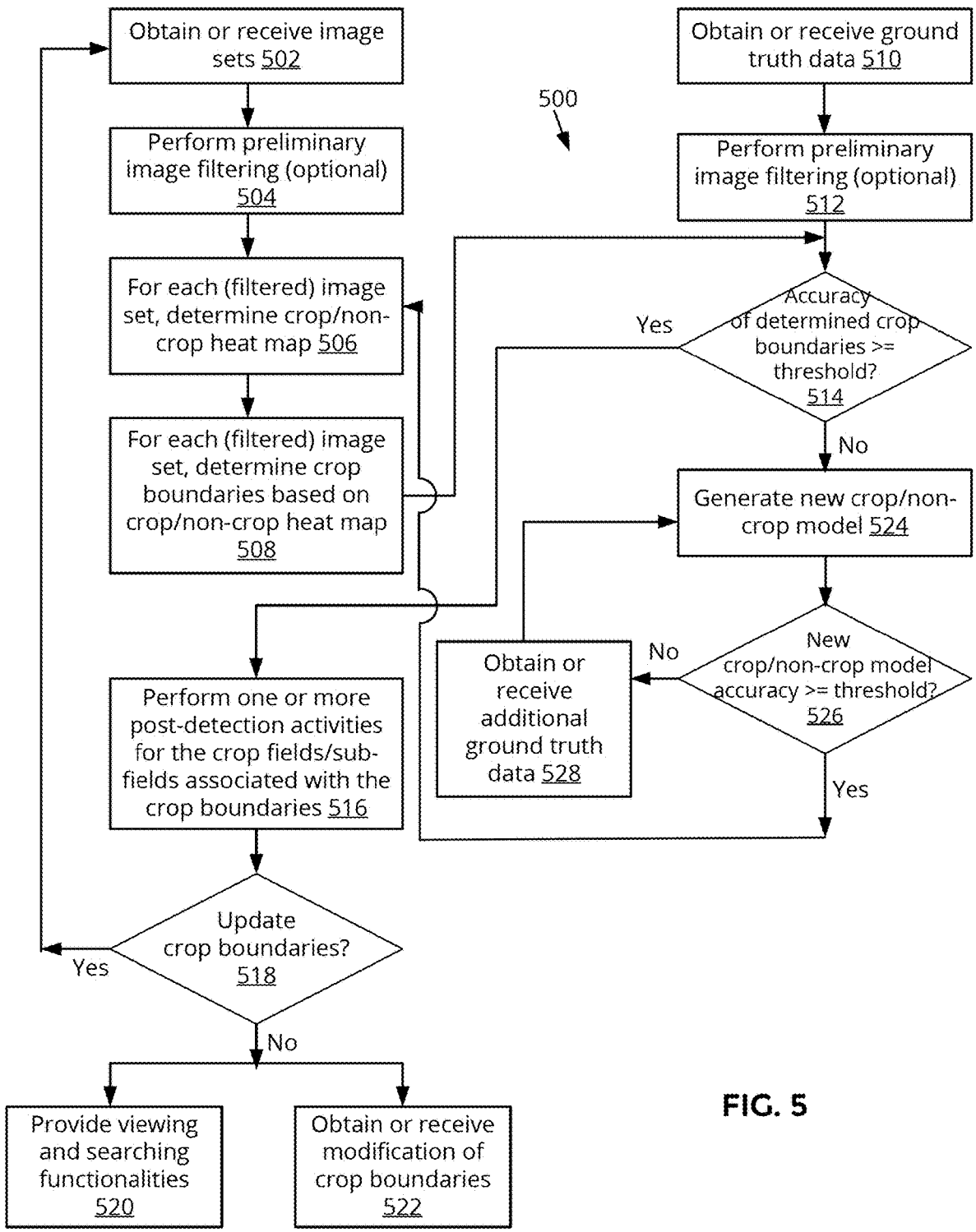
FIG. 5 depicts a flow diagram illustrating another example process that may be implemented by the system of FIG. 1, according to some embodiments.

FIG. 5 depicts a flow diagram illustrating an example process 500 that may be implemented by the system 100 to perform crop boundary detection using an existing crop boundary detection model and modifying the crop boundary detection model on an as needed basis, according to some embodiments. In some embodiments, blocks 502, 504, 506, 508 may be similar to respective blocks 210, 212, 214, 216 of FIG. 2, except that the image sets for which the crop boundary detection is performed may be associated with a geographical region and/or time period that differs from the geographical region and/or time period associated with the crop/non-crop model used in block 506.

Continuing the example above, the crop/non-crop model was generated based on images of the United States taken during years 2008-2016 while the image sets of block 502 may be images of the United States taken during years 2000-2007. As another example, the image sets of block 502 may be images of a geographical region other than the United States (e.g., a foreign country, China, Mexico, Canada, Africa, Eastern Europe, etc). As still another example, the image sets of block 502 may be images of a particular geographical region taken during years other than 2008-2016. Even though the crop/non-crop model may not be exactly tailored for the images to be processed, such model may be used as the starting point since it already exists. For countries outside the United States, no or insufficient publicly available ground truth data may exist to readily generate a crop/non-crop model.

In some embodiments, blocks 510-512 may be performed simultaneously with, before, or after blocks 502-508. Blocks 510, 512 may be similar to respective blocks 202, 204 of FIG. 2. The ground truth data obtained in block 510 may be associated with the same (or approximately the same) geographical region and/or time period as with the image sets of block 502. In some embodiments, the amount of ground truth data of block 510 may differ from the amount of ground truth data of block 202. A smaller amount of ground truth data may be available because little or no government/publically available crop data may exist for countries outside the United States or for earlier years.

At block 514, training logic 124 may be configured to evaluate the accuracy of at least a subset of crop boundaries predicted using the existing crop/non-crop model in block 508 by comparison against crop boundaries identified in the (filtered) ground truth data provided in blocks 510, 512. In some embodiments, respective crop boundaries associated with the same (or nearly the same) geographical areas in the two sets of identified crop boundaries data may be compared to each other.

If the accuracy of the predicted crop boundaries equals or exceeds a threshold (yes branch of block 514), then process 500 may proceed to blocks 516-522. The threshold may comprise a pre-set threshold such as 75%, 80%, 85%, 90%, or the like. The existing crop/non-crop model may be deemed to be suitable (or sufficiently accurate) for the particular geographical region and time period associated with the images of interest of block 502. In some embodiments, blocks 516, 518, 520, 522 may be similar to respective blocks 218, 220, 222, 224 of FIG. 2 except the crop boundaries of interest are those determined in block 508. In block 518, if crop boundaries are to be updated (yes branch of block 518), then process 500 may return to block 502. For crop boundary updates, blocks 510, 512, and 514 may not need to be repeated once the suitability/accuracy of the model has been initially confirmed.

If the accuracy of the predicted crop boundaries is less than a threshold (no branch of block 514), then process 500 may proceed to block 524. A new crop/non-crop model associated with the same (or nearly the same) geographical region and time period as the images obtained in block 502 may be generated. The new crop/non-crop model may comprise a modification of the existing crop/non-crop model or a model trained with only data corresponding to the geographical region and time period matching the images of interest. At block 524, the training logic 124 may be configured to generate a new crop/non-crop model based on (filtered) ground truth data of block 512 applied to one or more machine learning techniques/systems. Block 524 may be similar to block 206 of FIG. 2.

Next, at block 526, the accuracy of the new crop/non-crop model may be evaluated. If the accuracy is less than a threshold (no branch of block 526), then additional ground truth data may be obtained or received, at block 528, and training/refinement/building of the new crop/non-crop model may continue by returning to block 524. If the accuracy equals or exceeds the threshold (yes branch of block 526), then process 500 may proceed to block 506 to use the new crop/non-crop model with the (filtered) image sets from block 504 to generate crop/non-crop heat maps associated with the (filtered) image sets. In the case where a new crop/non-crop model has been generated due to insufficient accuracy of the existing crop/non-crop model, blocks 510, 512, 514 may not need to be repeated.

In this manner, crop fields/sub-fields in countries outside the United States and/or for time periods other than recent years may also be determined inexpensively, accurately, and automatically. Thus, collectively, all of the current and past (to the extent aerial image data is available) crop fields/sub-fields planet wide may be identified and appropriately catalogued/classified.

Figure 6:
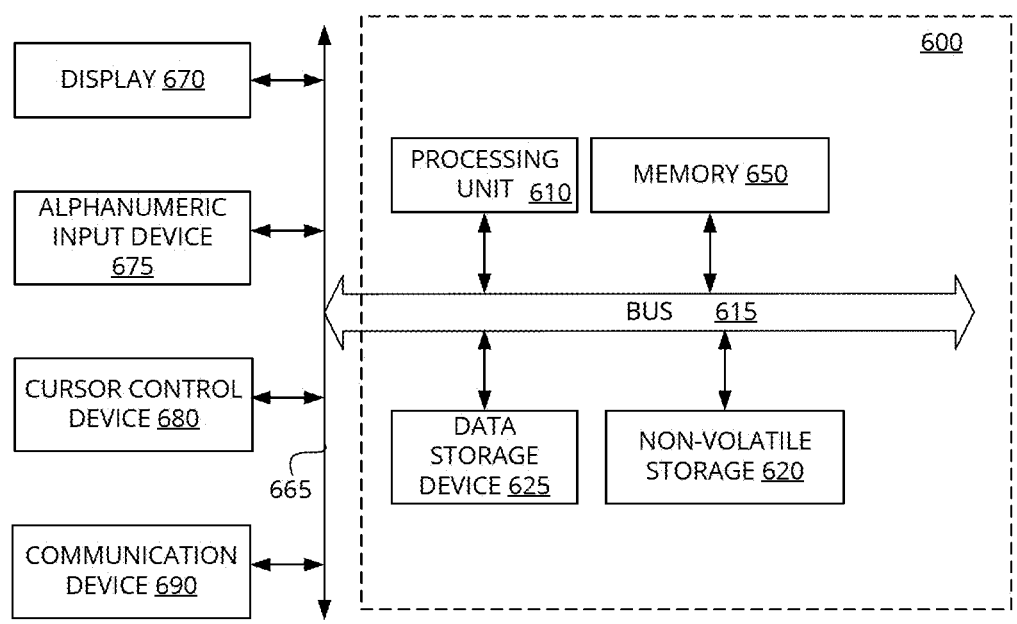
FIG. 6 depicts an example device that may be implemented in the system of FIG. 1 of the present disclosure, according to some embodiments.

FIG. 6 depicts an example device that may be implemented in the system 100 of the present disclosure, according to some embodiments. The device of FIG. 6 may comprise at least a portion of any of server 104, database 106, server 108, database 110, device 112, and/or device 116. Platform 600 as illustrated includes bus or other internal communication means 615 for communicating information, and processor 610 coupled to bus 615 for processing information. The platform further comprises random access memory (RAM) or other volatile storage device 650 (alternatively referred to herein as main memory), coupled to bus 615 for storing information and instructions to be executed by processor 610. Main memory 650 also may be used for storing temporary variables or other intermediate information during execution of instructions by processor 610. Platform 600 also comprises read only memory (ROM) and/or static storage device 620 coupled to bus 615 for storing static information and instructions for processor 610, and data storage device 625 such as a magnetic disk, optical disk and its corresponding disk drive, or a portable storage device (e.g., a universal serial bus (USB) flash drive, a Secure Digital (SD) card). Data storage device 625 is coupled to bus 615 for storing information and instructions.

Platform 600 may further be coupled to display device 670, such as a cathode ray tube (CRT) or a liquid crystal display (LCD) coupled to bus 615 through bus 665 for displaying information to a computer user. In embodiments where platform 600 provides computing ability and connectivity to a created and installed display device, display device 670 may display the images overlaid with the crop fields/sub-fields information as described above. Alphanumeric input device 675, including alphanumeric and other keys, may also be coupled to bus 615 through bus 665 (e.g., via infrared (IR) or radio frequency (RF) signals) for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670. In embodiments utilizing a touchscreen interface, it is understood that display 670, input device 675, and cursor control device 680 may all be integrated into a touch-screen unit.

Another component, which may optionally be coupled to platform 600, is a communication device 690 for accessing other nodes of a distributed system via a network. Communication device 690 may include any of a number of commercially available networking peripheral devices such as those used for coupling to an Ethernet, token ring, Internet, or wide area network. Communication device 690 may further be a null-modem connection, or any other mechanism that provides connectivity between platform 600 and the outside world. Note that any or all of the components of this system illustrated in FIG. 6 and associated hardware may be used in various embodiments of the disclosure.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
    receiving, by a computing device, input containing one or more search parameters, wherein the one or more search parameters include one or more of a latitude, a longitude, a county, a size, a shape, and an identifier;
    presenting, by the computing device, an image depicting a geographical region, wherein the image is selected based on the one or more search parameters; and
    presenting, by the computing device, indications of crop areas overlaying the image, wherein the crop areas are defined by crop boundary locations determined by:
        obtaining a plurality of image sets associated with the geographical region and a time period, wherein each image set of the plurality of image sets comprises multi-spectral and time series images that depict a respective particular portion of the geographical region during the time period;
        determining probabilities that pixels of images in an image set of the plurality of image sets depict a crop versus a non-crop; and
        determining crop boundary locations within the particular portion of the geographical region based on the determined probabilities.

2. The method of claim 1, further comprising providing a user interface through which crop boundary locations are capable of being manually modified by a user;
    receiving crop boundary location modifications from the user; and
    updating a database storing the image and the crop areas with the crop boundary location modifications.

3. The method of claim 1, wherein the crop boundary locations are determined at a sub-meter ground resolution.

4. The method of claim 1, wherein determining the crop boundary locations includes determining the crop boundary locations based on the determined probabilities and one or more of application of prior knowledge of physical structures or agricultural practices proximate to particular portions of the geographical region associated with the image set, smoothing of crop boundary location pixels, and application of non-supervised clustering and region growing techniques.

5. The method of claim 1, wherein determining the probabilities that pixels of images in an image set of the plurality of image sets depict the crop versus the non-crop comprises applying the image set to one or more machine learning systems configured to determine probabilities that pixels of images in image sets depict the crop versus the non-crop after supervised training on ground truth data.

6. The method of claim 5, wherein the one or more machine learning systems include a convolutional neural network (CNN).

7. The method of claim 5, wherein the ground truth data comprises one or more of government crop data, publicly available crop data, images with crop areas identified at low ground resolution, images with manually identified crop boundaries, crop survey data, sampled crop data, and farmer reports.

8. The method of claim 5, wherein one or both of a first geographical region and a first time period associated with the ground truth data matches the geographical region and the time period associated with the plurality of image sets.

9. The method of claim 5, wherein one or both of a first geographical region and a first time period associated with the ground truth data is different from the geographical region and the time period associated with the plurality of image sets.

10. The method of claim 1, wherein the crop boundary locations are determined by further:
    prior to determining the probabilities, filtering the plurality of image sets of one or more of clouds, shadows, haze, fog, and atmospheric obstructions, and wherein determining the probabilities that the pixels of the images in the image set of the plurality of image sets depict the crop versus the non-crop comprises using a filtered image set associated with the image set.

11. A non-transitory computer-readable medium having logic stored thereon that, in response to execution by one or more processors of a computing device, causes the computing device to perform actions comprising:
    receiving, by the computing device, input containing one or more search parameters, wherein the one or more search parameters include one or more of a latitude, a longitude, a county, a size, a shape, and an identifier;

presenting, by the computing device, an image depicting a geographical region, wherein the image is selected based on the one or more search parameters; and presenting, by the computing device, indications of crop areas overlaying the image, wherein the crop areas are defined by crop boundary locations determined by:

obtaining a plurality of image sets associated with the geographical region and a time period, wherein each image set of the plurality of image sets comprises multi-spectral and time series images that depict a respective particular portion of the geographical region during the time period;

determining probabilities that pixels of images in an image set of the plurality of image sets depict a crop versus a non-crop; and determining crop boundary locations within the particular portion of the geographical region based on the determined probabilities.

12. The computer-readable medium of claim 11, wherein the actions further comprise providing a user interface through which crop boundary locations are capable of being manually modified by a user;

receiving crop boundary location modifications from the user; and updating a database storing the image and the crop areas with the crop boundary location modifications.

13. The computer-readable medium of claim 11, wherein the crop boundary locations are determined at a sub-meter ground resolution.

14. The computer-readable medium of claim 11, wherein determining the crop boundary locations includes determining the crop boundary locations based on the determined probabilities and one or more of application of prior knowledge of physical structures or agricultural practices proximate to particular portions of the geographical region associated with the image set, smoothing of crop boundary location pixels, and application of non-supervised clustering and region growing techniques.

15. The computer-readable medium of claim 11, wherein determining the probabilities that pixels of images in an image set of the plurality of image sets depict the crop versus the non-crop comprises applying the image set to one or more machine learning systems configured to determine probabilities that pixels of images in image sets depict the crop versus the non-crop after supervised training on ground truth data.

16. The computer-readable medium of claim 15, wherein the one or more machine learning systems include a convolutional neural network (CNN).

17. The computer-readable medium of claim 15, wherein the ground truth data comprises one or more of government crop data, publicly available crop data, images with crop areas identified at low ground resolution, images with manually identified crop boundaries, crop survey data, sampled crop data, and farmer reports.

18. The computer-readable medium of claim 15, wherein one or both of a first geographical region and a first time period associated with the ground truth data matches the geographical region and the time period associated with the plurality of image sets.

19. The computer-readable medium of claim 15, wherein one or both of a first geographical region and a first time period associated with the ground truth data is different from the geographical region and the time period associated with the plurality of image sets.

20. The computer-readable medium of claim 11, wherein the crop boundary locations are determined by further:

prior to determining the probabilities, filtering the plurality of image sets of one or more of clouds, shadows, haze, fog, and atmospheric obstructions, and wherein determining the probabilities that the pixels of the images in the image set of the plurality of image sets depict the crop versus the non-crop comprises using a filtered image set associated with the image set.

* * * * *